US012764841B2

(12) United States Patent
Lu

(10) Patent No.: US 12,764,841 B2
(45) Date of Patent: Oct. 13, 2026

(54) INTELLIGENT CHANGE-OVER CONTROL CIRCUIT FOR LED POWER SUPPLY

(71) Applicant: HUIZHOU RIHENG TECHNOLOGY CO., LTD., Huzhou (CN)

(72) Inventor: Jian Lu, Jinshi (CN)

(73) Assignee: HUIZHOU RIHENG TECHNOLOGY CO., LTD., Huizhou (CN)

(*) Notice: Subject to any disclaimer, the term of this patent is extended or adjusted under 35 U.S.C. 154(b) by 27 days.

(21) Appl. No.: 19/006,957

(22) Filed: Dec. 31, 2024

(65) Prior Publication Data

US 2026/0164521 A1 Jun. 11, 2026

(30) Foreign Application Priority Data

Dec. 6, 2024 (CN) ........................ 202423026193.6

(51) Int. Cl.
*H05B 45/00* (2022.01)
*H05B 45/325* (2020.01)

(52) U.S. Cl.
CPC .................................. *H05B 45/325* (2020.01)

(58) Field of Classification Search
CPC ...... H05B 45/00; H05B 45/32; H05B 45/325; H05B 45/34; H05B 45/345; H05B 45/3725
See application file for complete search history.

(56) References Cited

U.S. PATENT DOCUMENTS

| | | | | |
|---|---|---|---|---|
| 10,805,996 | B1 * | 10/2020 | Deng | H05B 45/325 |
| 11,490,478 | B1 * | 11/2022 | Lu | H05B 45/37 |
| 12,184,181 | B2 * | 12/2024 | Zhu | H02M 1/327 |
| 2011/0043115 | A1 * | 2/2011 | Ge | H05B 45/10 315/119 |
| 2012/0062133 | A1 * | 3/2012 | Cubias | H05B 45/20 315/201 |
| 2019/0098723 | A1 * | 3/2019 | Sadwick | H05B 45/3725 |
| 2023/0268840 | A1 * | 8/2023 | Zhu | H02M 1/14 363/71 |
| 2024/0196496 | A1 * | 6/2024 | Zhao | H05B 45/10 |
| 2024/0206032 | A1 * | 6/2024 | Wen | H05B 45/325 |

* cited by examiner

*Primary Examiner* — Thai Pham
(74) *Attorney, Agent, or Firm* — HOWARD M COHN and Associates, LLC

(57) ABSTRACT

The present disclosure discloses an intelligent change-over control circuit for an LED power supply, including a single chip microcomputer control module, a main power module, a main power switch module, a voltage control module, a current control module, a pulse width control module, at least one pulse width adjustment module and other modules. The circuit in the present disclosure is reasonable in design, can automatically recognize a voltage, a current and a power required by an LED lamp and finally output an accurate voltage and current to ensure the LED lamp can work in the more appropriate state, not only can prolong the service life, but also can avoid resource waste and save energy, and can be automatically matched with various types of LED lamps with various voltages and currents via the same LED power supply.

6 Claims, 9 Drawing Sheets

INTELLIGENT CHANGE-OVER CONTROL CIRCUIT FOR LED POWER SUPPLY

TECHNICAL FIELD

The present disclosure relates to the technical field of LED power supplies, in particular to an intelligent change-over control circuit for an LED power supply.

BACKGROUND ART

At present, there have been various types of LED lamps on the market, and required parameters such as a voltage and a current are not the same, which results in excessive LED power supply types, repeated waste, etc., thereby causing the following problems:

1. For users, non-professional users have to make much effort to know about an LED matched power supply, and if a mismatch appears, the service life of an LED will be affected, and other wrong application phenomena will be caused.
2. For manufacturers, the various LED power supply types aggravate the inventory pressure and the production fund pressure of the manufacturers and increase the production cost, and result in a plurality of production difficulties.
3. For commercial agents, the various LED power supply types not only prolong the stockup turnover cycle and affect product performances, but also aggravate the stockup fund pressure and increase business risks, etc.

SUMMARY OF THE INVENTION

Objects of the present disclosure are to overcome the above-mentioned defects in the prior art and to provide an intelligent change-over control circuit for an LED power supply, which can be automatically matched with various types of LED lamps with various voltages and currents via the same LED power supply.

In order to achieve the above-mentioned objects, the present disclosure provides an intelligent change-over control circuit for an LED power supply, including a single chip microcomputer control module, a main power module, a main power switch module, a voltage control module, a current control module, a pulse width control module, and at least one pulse width adjustment module, wherein the single chip microcomputer control module is electrically connected with the main power switch module, the voltage control module, the current control module and the pulse width control module, respectively, the main power module is electrically connected with the main power switch module, and each pulse width adjustment module is electrically connected with the pulse width control module.

Preferably, the circuit further includes a 16V power module, wherein the 16V power module is electrically connected with the main power switch module.

Preferably, the circuit further includes a 10V power module, wherein the 10V power module is electrically connected with the 16V power module.

Preferably, the circuit further includes a 5V power module, wherein the 5V power module is electrically connected with the 10V power module and the single chip microcomputer control module.

Preferably, provided are three pulse width adjustment modules that are a first pulse width adjustment module, a second pulse width adjustment module, and a third pulse width adjustment module, respectively.

Preferably, the circuit further includes a change-over switch module, wherein the change-over switch module is electrically connected with the single chip microcomputer control module.

Preferably, the circuit further includes a burning interface, wherein the burning interface is electrically connected with the single chip microcomputer control module.

Compared with the prior art, the present disclosure has the beneficial effects that:

1. the circuit in the present disclosure is reasonable in design, can automatically recognize a voltage, a current and a power required by an LED lamp and finally output an accurate voltage and current to ensure that the LED lamp can work in the more appropriate state, not only can prolong the service life, but also can avoid resource waste and save energy, and can be automatically matched with various types of LED lamps with various voltages and currents via the same LED power supply.
2. After the present disclosure is used, in term of users, categories of LED power supplies can be simplified, and professional matching problems can be solved; in term of manufacturers, the production cost, the research and development investment costs and the maintenance cost can be reduced; and in terms of stockup turnover cycles and stockup funds of commercial agents, business risks can be greatly reduced, the stockup cycle can be shortened, and the fund pressure can be reduced.

DETAILED DESCRIPTION OF THE INVENTION

In order to make objects, technical solutions and advantages of embodiments of the present disclosure clearer, the technical solutions in the embodiments of the present disclosure will be described clearly and completely below.

Obviously, the described embodiments are a part of the embodiments of the present disclosure, not all the embodiments. Based on the embodiments of the present disclosure, all other embodiments obtained by those of ordinary skill in the art without creative efforts shall fall within the protective scope of the present disclosure.

Figure 1:
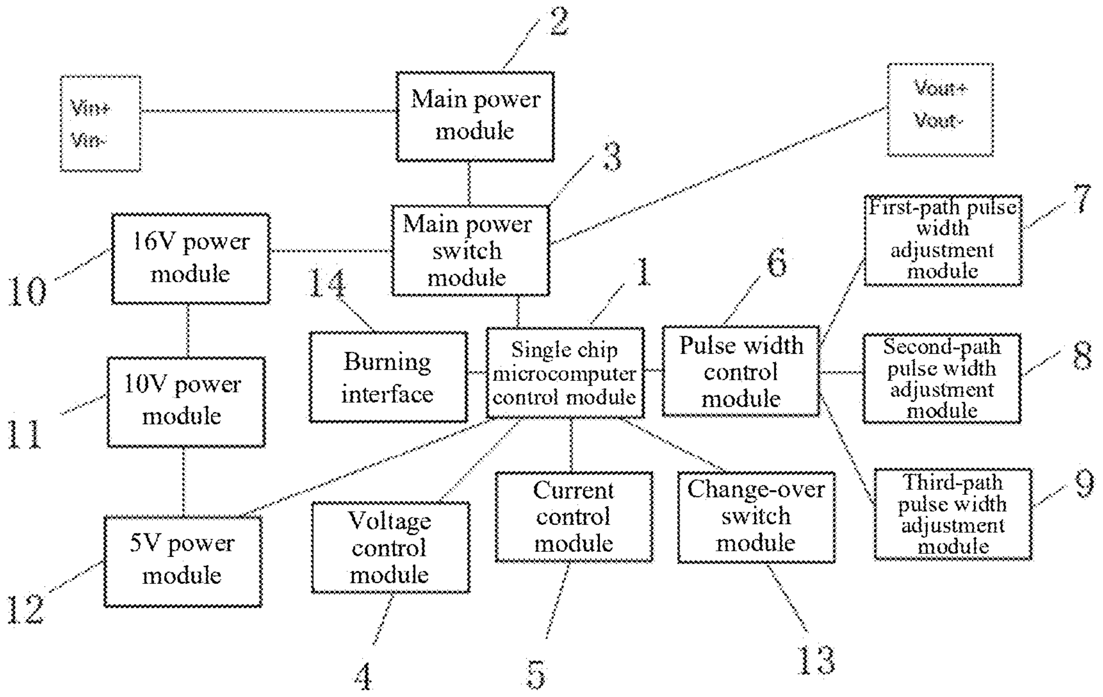
FIG. 1 is a circuit module block diagram of an intelligent change-over control circuit for an LED power supply.
Figure 2:
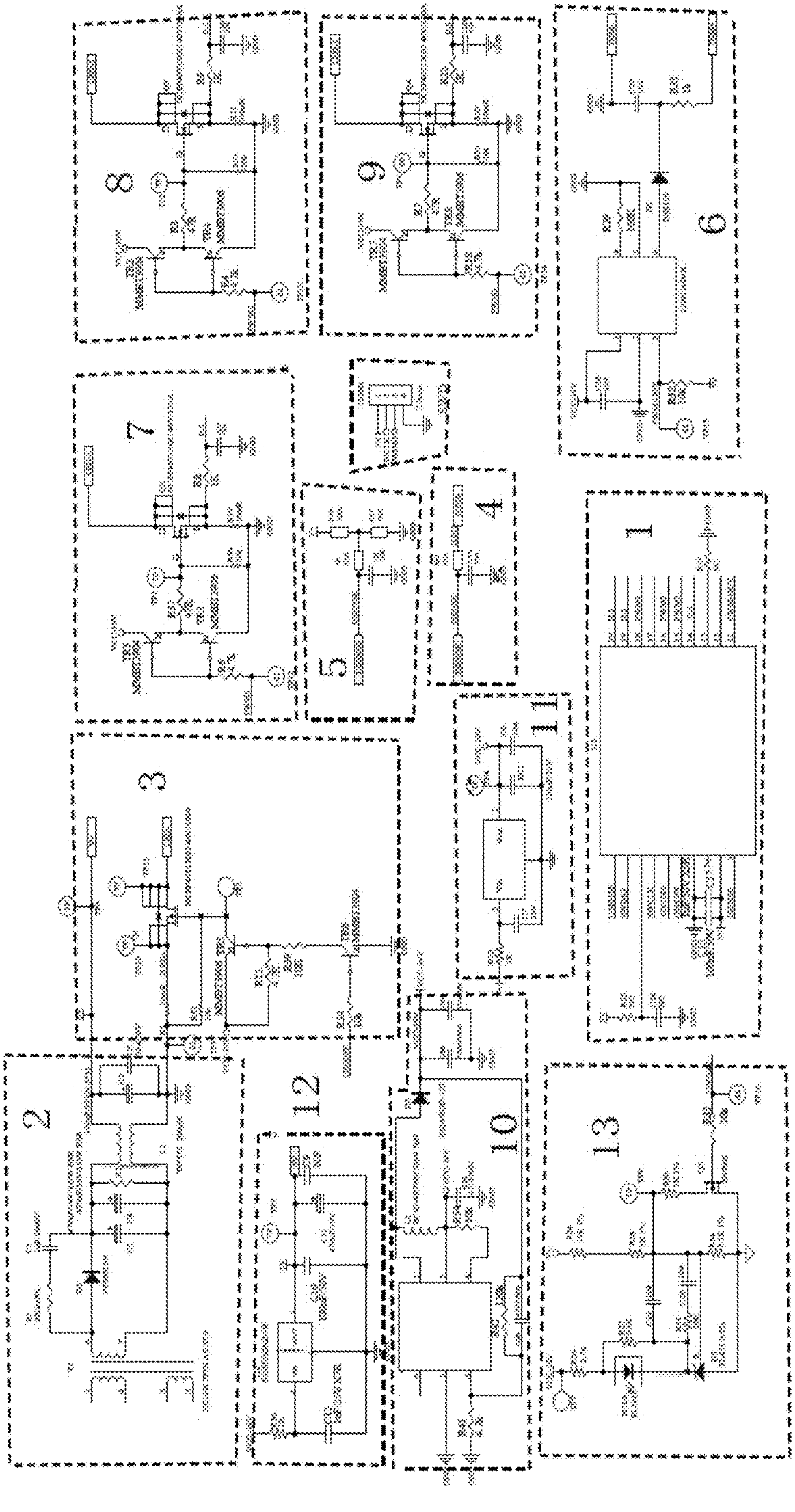
FIG. 2 is a schematic circuit diagram of an intelligent change-over control circuit for an LED power supply.

Referring to FIG. 1 and FIG. 2, an embodiment of the present disclosure provides an intelligent change-over control circuit for an LED power supply, including a single chip microcomputer control module 1, a main power module 2, a main power switch module 3, a voltage control module 4, a current control module 5, a pulse width control module 6, a first pulse width adjustment module 7, a second pulse width adjustment module 8, a third pulse width adjustment module 9 and other modules, wherein the single chip microcomputer control module 1 is electrically connected with the main power switch module 3, the voltage control module 4, the current control module 5 and the pulse width control module 6, respectively, the main power module 2 is electrically connected with the main power switch module 3, and each of the first pulse width adjustment module 7, the second pulse width adjustment module 8 and the third pulse width adjustment module 9 is electrically connected with the pulse width control module 6.

All components in the present embodiment will be described in detail below in conjunction with the accompanying drawings.

Figure 3:
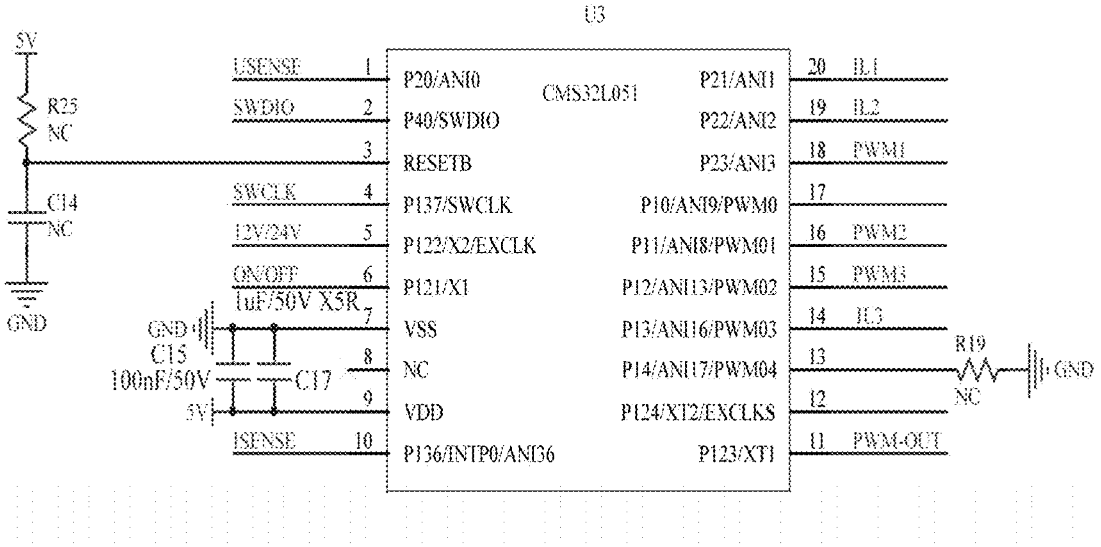
FIG. 3 is a schematic circuit diagram of a single chip microcomputer control module.

As shown in FIG. 3, the single chip microcomputer control module 1 can include a single chip microcomputer U3 (which can be of a type CMS32L051), a capacitor C14, a capacitor C15, a capacitor C17, a resistor R19, a capacitor R25 and other elements.

Figure 4:
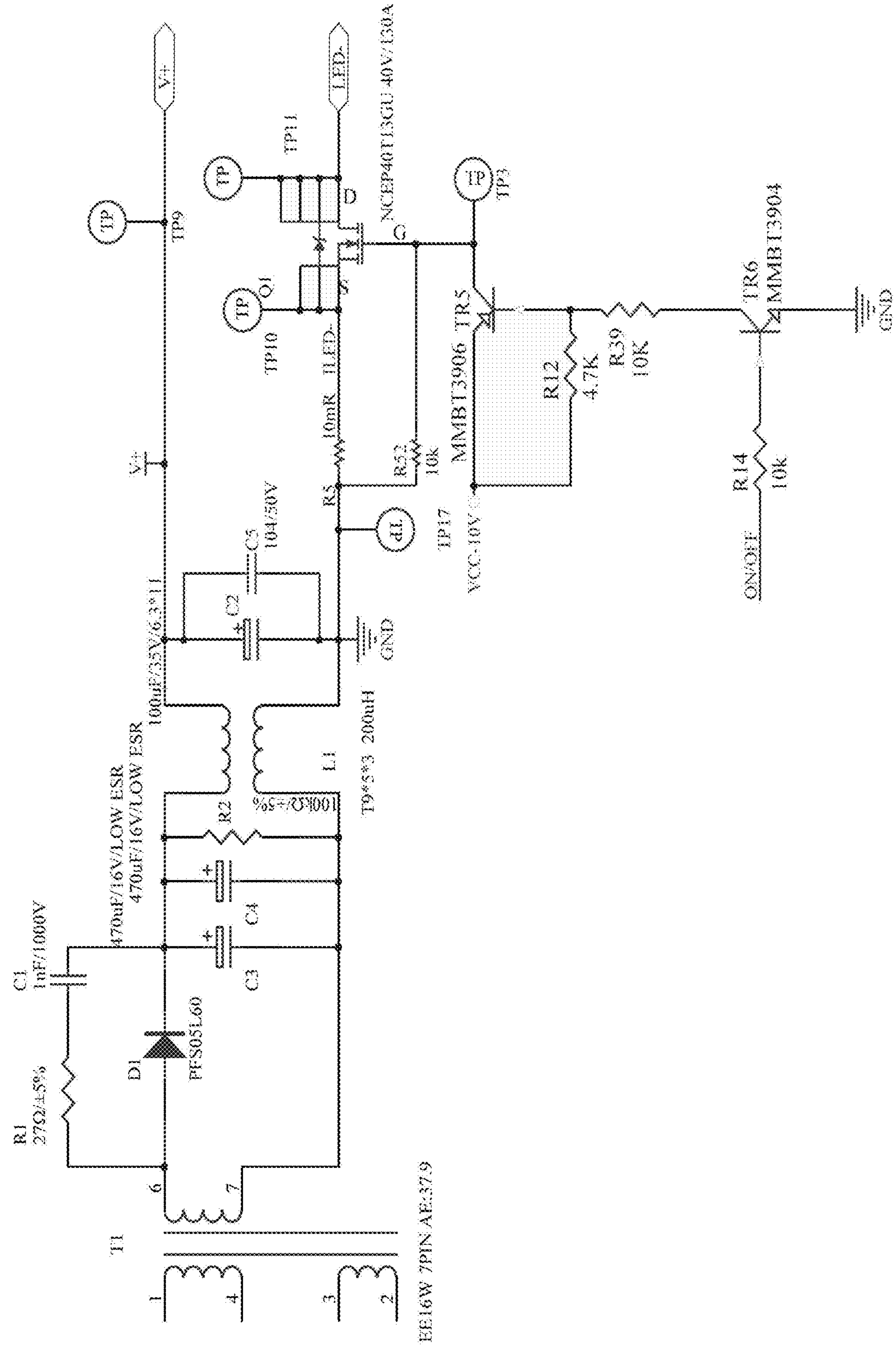
FIG. 4 is a schematic circuit diagram of a main power module and a main power switch module.

As shown in FIG. 4, the main power module 2 can include a transformer T1, a diode D1, a resistor R1, a resistor R2, a capacitor C1, a capacitor C2, a capacitor C3, a capacitor C4, an inductive coil L1 and other elements.

As shown in FIG. 4, the main power switch module 3 can include a resistor R5, a resistor R52, a resistor R12, a resistor R39, a resistor R14, an MOS tube Q1, a triode TR5, a triode TR6 and other elements.

Figure 5:
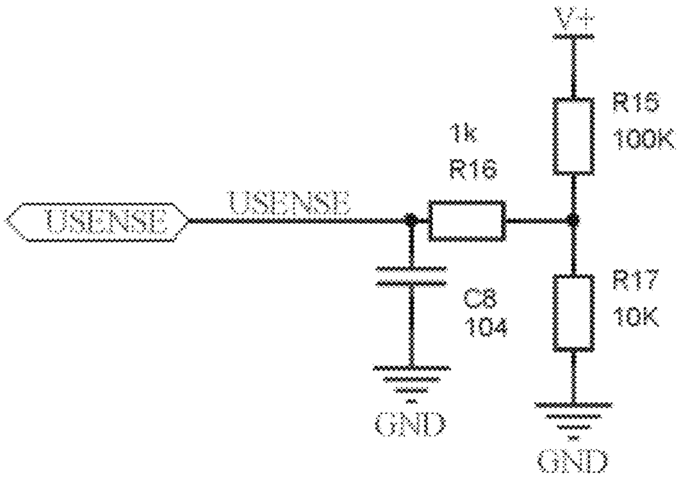
FIG. 5 is a schematic circuit diagram of a voltage control module.

As shown in FIG. 5, the voltage control module 4 can include a resistor R15, a resistor R16, a resistor R17, a capacitor C8 and other elements.

Figure 6:
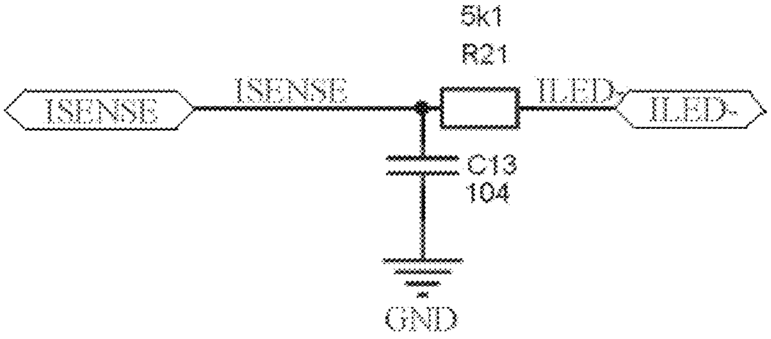
FIG. 6 is a schematic circuit diagram of a current control module.

As shown in FIG. 6, the current control module 5 can include a resistor R21, a capacitor C13 and other elements.

Figure 7:
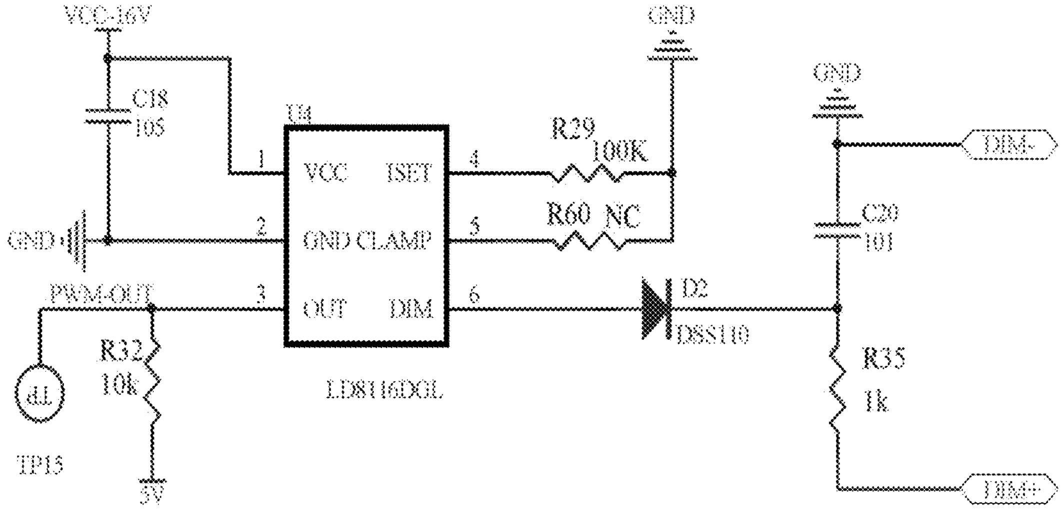
FIG. 7 is a schematic circuit diagram of a pulse width control module.

As shown in FIG. 7, the pulse width control module 6 can include an LD8116DGL chip U4, a capacitor C18, a resistor R32, a diode D2, a resistor R35, a capacitor C20, a resistor R29, a resistor R60 and other elements.

Figure 8:
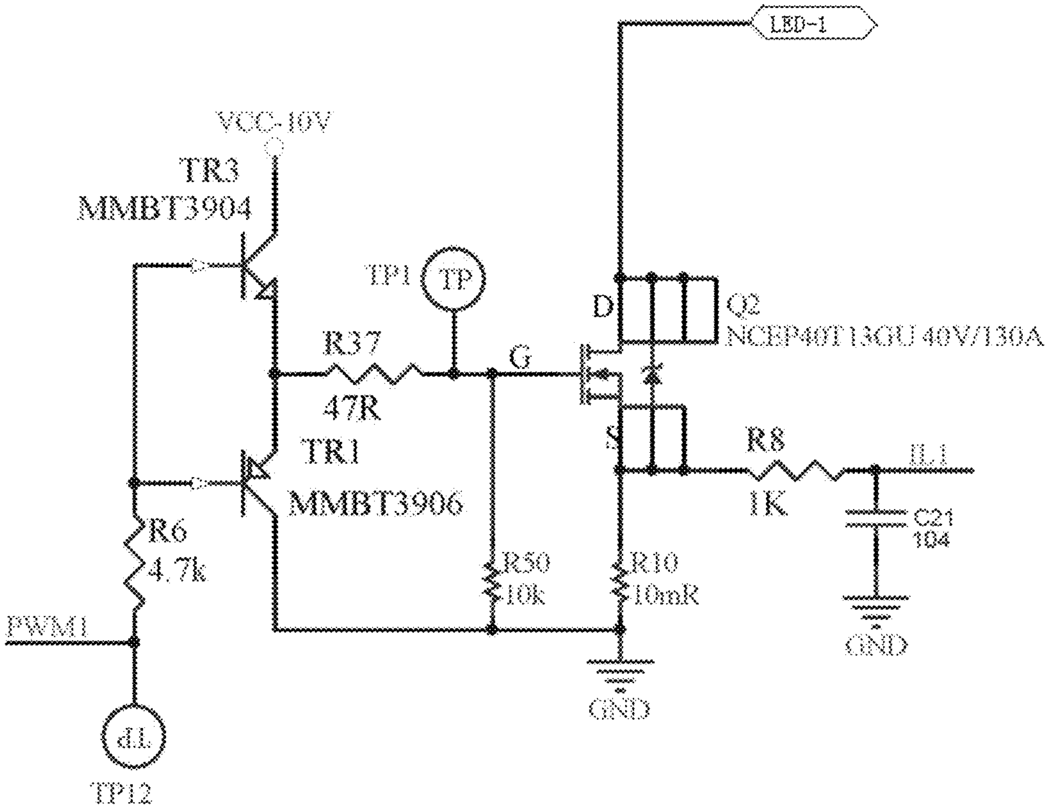
FIG. 8 is a schematic circuit diagram of a first pulse width adjustment module.

As shown in FIG. 8, the first pulse width adjustment module 7 includes a triode TR1, a triode TR3, an MOS tube Q2, a resistor R37, a resistor R6, a resistor R50, a resistor R8, a resistor R10, a capacitor C21 and other elements.

Figure 9:
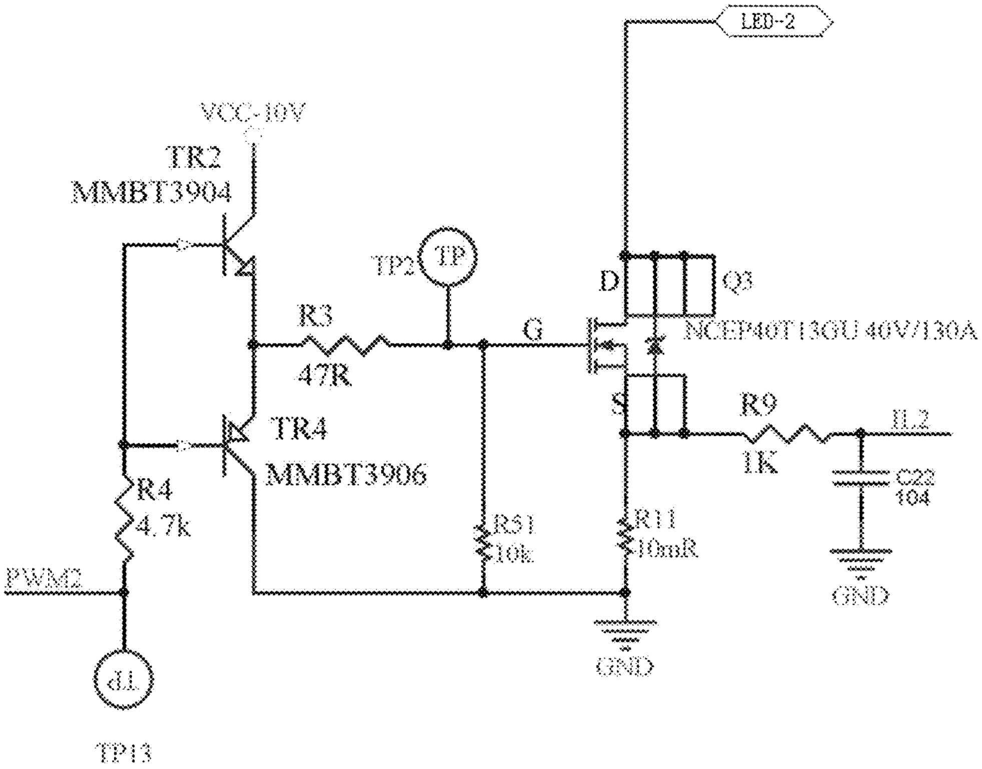
FIG. 9 is a schematic circuit diagram of a second pulse width adjustment module.

As shown in FIG. 9, the second pulse width adjustment module 8 can include a triode TR2, a triode TR4, an MOS tube Q3, a resistor R3, a resistor R4, a resistor R51, a resistor R11, a resistor R9, a capacitor C22 and other elements.

Figure 10:
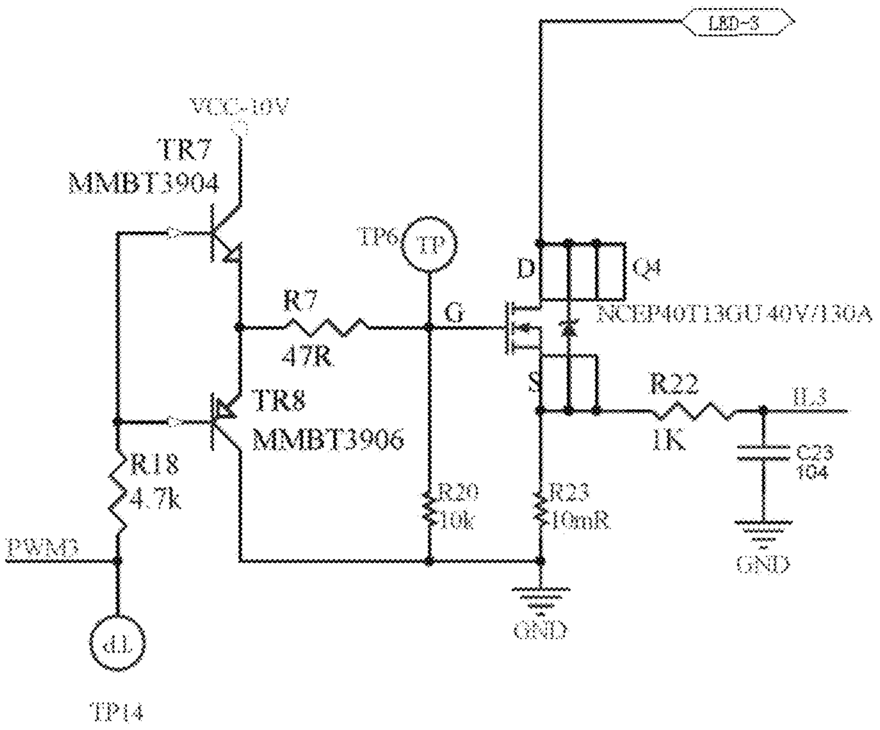
FIG. 10 is a schematic circuit diagram of a third pulse width adjustment module.

As shown in FIG. 10, the third pulse width adjustment module 9 can include a triode TR7, a triode TR8, an MOS tube Q4, a resistor R18, a resistor R7, a resistor R20, a resistor R23, a resistor R22, a capacitor C23 and other elements.

The three pulse width adjustment modules can control an LED by means of a PWM signal.

Figure 11:
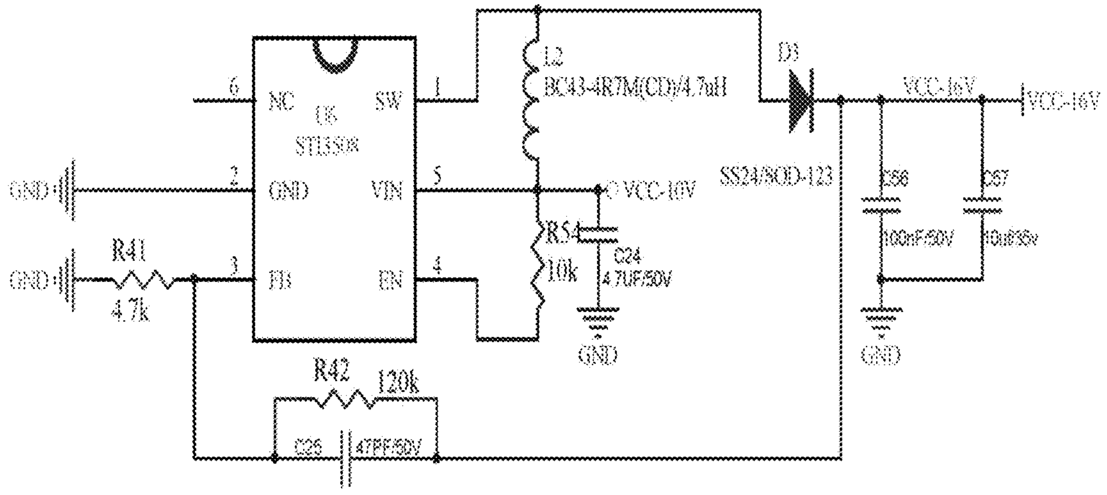
FIG. 11 is a schematic circuit diagram of a 16V power module.

As shown in FIG. 1 and FIG. 11, the intelligent change-over control circuit can further include a 16V power module 10, wherein the 16V power module 10 is electrically connected with the main power switch module 3. Specifically, the 16V power module 10 includes an STI3508 chip U6, a resistor R41, a resistor R42, a resistor R54, a capacitor C24, a capacitor C25, an inductor L2, a diode D3, a capacitor C56, a capacitor C57 and other elements.

Figure 12:
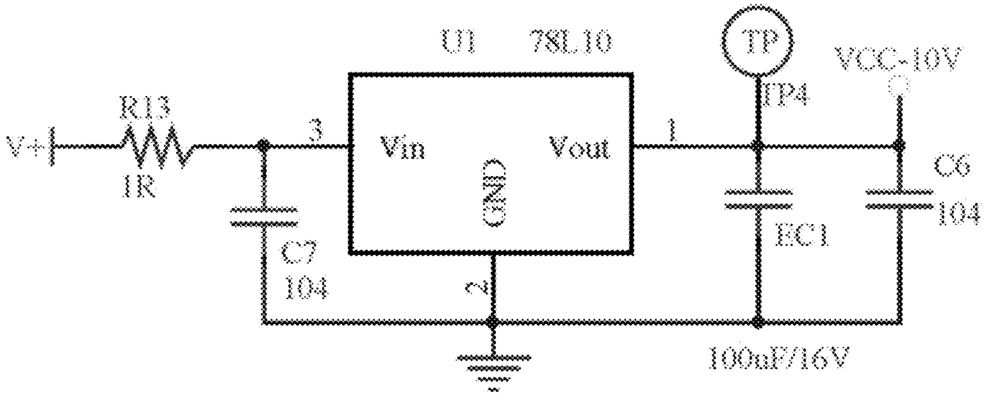
FIG. 12 is a schematic circuit diagram of a 10V power module.

As shown in FIG. 1 and FIG. 12, the intelligent change-over control circuit can further include a 10V power module 11, wherein the 10V power module 11 is electrically connected with the 16V power module. Specifically, the 10V power module 11 can include a 78L10 chip U1, a resistor R13, a capacitor C7, a capacitor EC1, a capacitor C6 and other elements.

Figure 13:
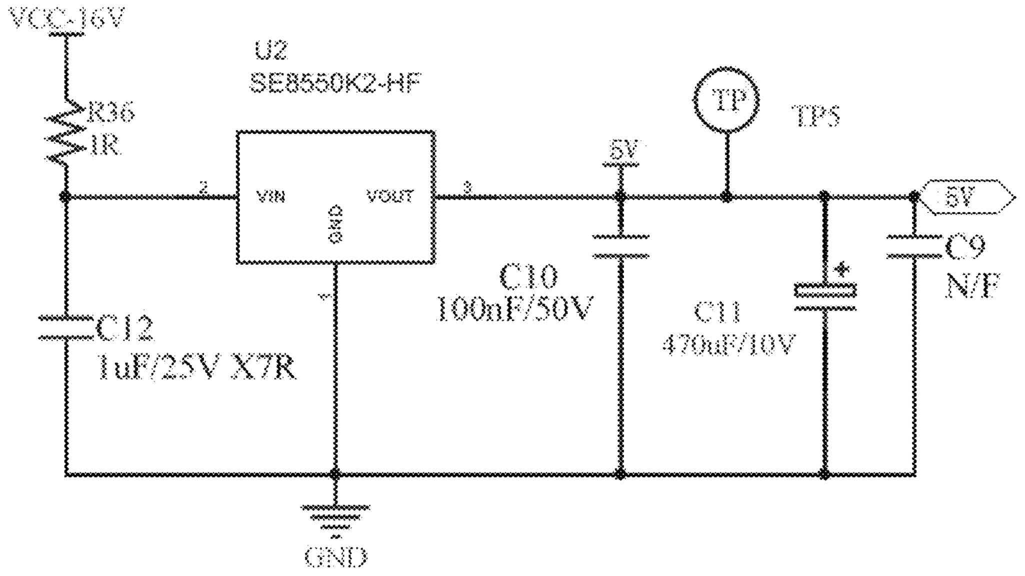
FIG. 13 is a schematic circuit diagram of a 5V power module.

As shown in FIG. 1 and FIG. 13, the intelligent change-over control circuit can further include a 5V power module 12, wherein the 5V power module 12 is electrically connected with the 10V power module and the single chip microcomputer control module 1. Specifically, the 5V power module 12 can include an SE8550K2-HF chip U2, a resistor R36, a capacitor C12, a capacitor C10, a capacitor C9, a capacitor C11 and other elements.

Figure 14:
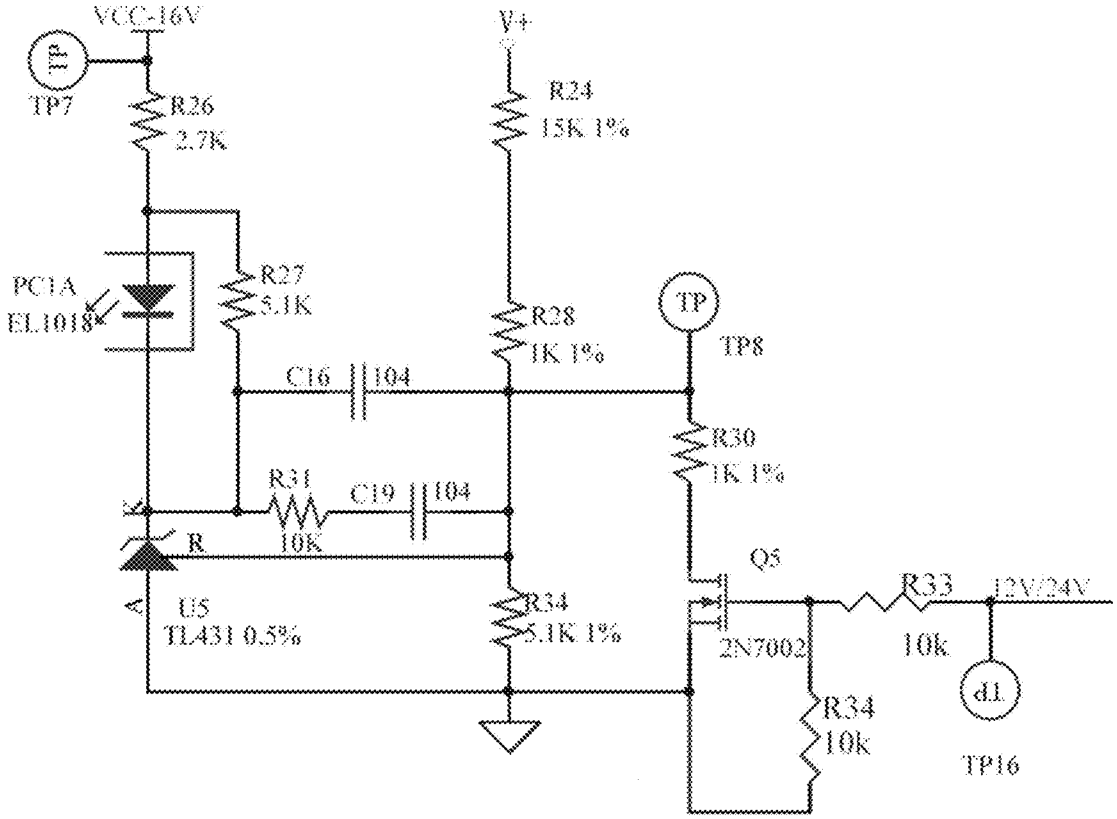
FIG. 14 is a schematic circuit diagram of a change-over switch module.

As shown in FIG. 1 and FIG. 14, the intelligent change-over control circuit can further include a change-over switch module 13, wherein the change-over switch module 13 is electrically connected with the single chip microcomputer control module 1. Specifically, the change-over switch module 13 can include a resistor R26, a resistor R27, a resistor R28, a resistor R30, a resistor R31, a resistor R33, a resistor R34, a capacitor C16, a capacitor C19, a diode PC1A, a voltage-stabilizing diode U5, an MOS tube Q5 and other elements.

As shown in FIG. 1 and FIG. 2, the intelligent change-over control circuit can further include a burning interface 14, wherein the burning interface 14 is electrically connected with the single chip microcomputer control module 1.

A working principle of the present disclosure is described as follows:

During work, the single chip microcomputer control module 1 can automatically recognize a voltage, a current and a power required by an LED lamp and finally output an accurate voltage and current to ensure that the loaded LED lamp can work in the more appropriate state.

In conclusion, the circuit in the present disclosure is reasonable in design, and can be automatically matched with various types of LED lamps with various voltages and currents via the same LED power supply so as to not only prolong the service life, but also avoid resource waste and save energy.

The above-mentioned embodiments are preferred implementations of the present disclosure, but implementations of the present disclosure are not limited by the above-mentioned embodiments. Any other changes, modifications, substitutions, combinations and simplifications made without departing from the spirit essence and principle of the present disclosure shall fall within the protective scope of the present disclosure.

What is claimed is:

1. An intelligent change-over control circuit for a light emitting diode (LED) power supply, comprising a single chip microcomputer control module, a main power module, a main power switch module, a voltage control module, a current control module, a pulse width control module, and at least one pulse width adjustment module, wherein the single chip microcomputer control module is electrically connected with the main power switch module, the voltage control module, the current control module and the pulse width control module, respectively, the main power module is electrically connected with the main power switch module, and wherein the at least one pulse width adjustment module having a first pulse width adjustment module, a second pulse width adjustment module, and a third pulse width adjustment module electrically connected with the pulse with control module, respectively.

2. The intelligent change-over control circuit for the LED power supply of claim 1, further comprising a 16V power module, wherein the 16V power module is electrically connected with the main power switch module.

3. The intelligent change-over control circuit for the LED power supply of claim 2, further comprising a 10V power module, wherein the 10V power module is electrically connected with the 16V power module.

4. The intelligent change-over control circuit for the LED power supply of claim 3, further comprising a 5V power module, wherein the 5V power module is electrically connected with the 10V power module and the single chip microcomputer control module.

5. The intelligent change-over control circuit for the LED power supply of claim 1, further comprising a change-over switch module, wherein the change-over switch module is electrically connected with the single chip microcomputer control module.

6. The intelligent change-over control circuit for the LED power supply of claim 1, further comprising a burning interface, wherein the burning interface is electrically connected with the single chip microcomputer control module.

* * * * *